Sept. 9, 1924.  
D. W. SMITH  
CONVEYER MECHANISM FOR PIE MAKING MACHINES  
Filed July 31, 1922  
1,507,800
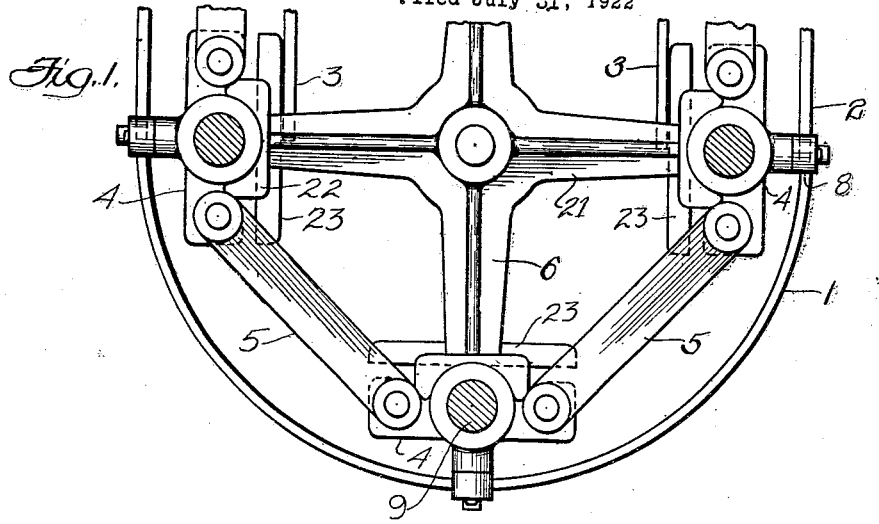
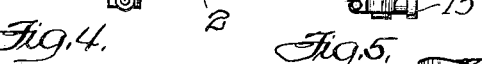
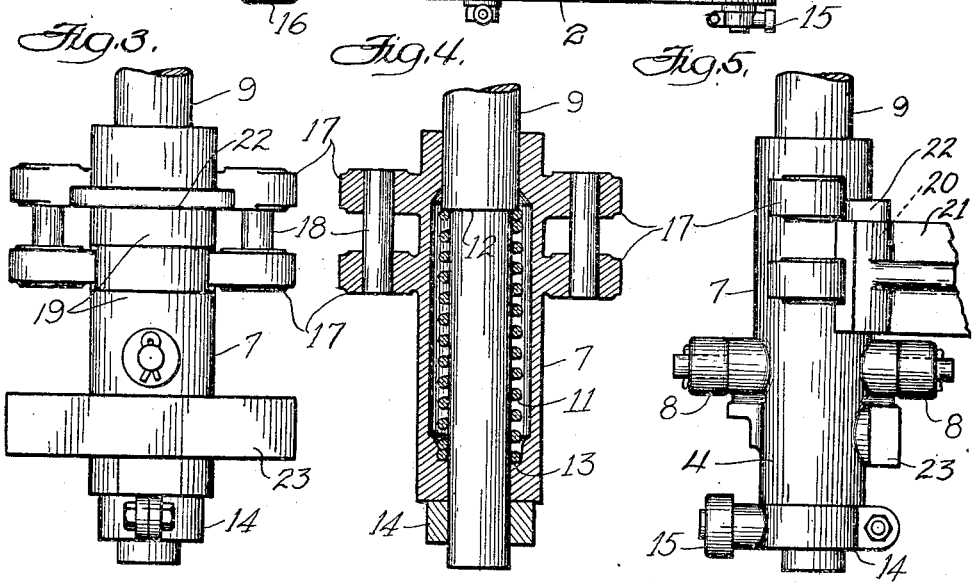
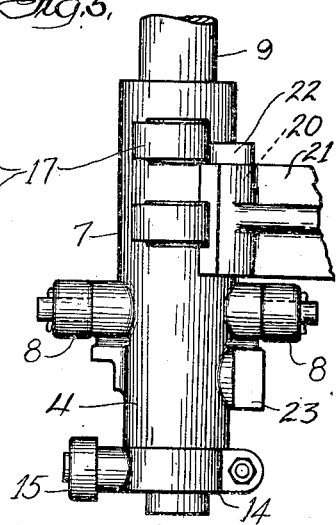

Patented Sept. 9, 1924.

1,507,800

UNITED STATES PATENT OFFICE.

DENNIS WOOD SMITH, OF WILMETTE, ILLINOIS, ASSIGNOR TO COLBORNE MANUFACTURING COMPANY, OF CHICAGO, ILLINOIS, A CORPORATION OF ILLINOIS.

CONVEYER MECHANISM FOR PIE-MAKING MACHINES.

Application filed July 31, 1922. Serial No. 578,887.

*To all whom it may concern:*

Be it known that I, DENNIS WOOD SMITH, a citizen of the United States of America, and a resident of Wilmette, county of Cook, and State of Illinois, have invented a new and useful Improvement in Conveyer Mechanism for Pie-Making Machines, of which the following is a specification.

This invention relates to pie-making machines wherein the various operations of making pies are performed while the pie tins are moved by a conveyer along a definite horizontal path.

The main objects of this invention are to provide an improved form of conveyer adapted to insure the movement of the plate holders along said path without variation therefrom, whereby the pie tins will always be in the proper positions to accurately coact with the pie forming mechanisms; to provide a conveyer of the above character including an improved form of link construction coacting with the plate holder carriers to form an endless belt; and to provide an improved form and arrangement of sprocket mechanism coacting with the endless belt for holding the carriers in proper position to coact with said pie forming mechanisms.

An illustrative embodiment of this invention is shown in the accompanying drawings, wherein—

Fig. 1 is a fragmentary plan, showing one end of a conveyer embodying this invention, the plate holders being removed from the carriers for the sake of clearness.

Fig. 2 is a fragmentary side elevation of the same, showing two of the plate holders and carriers.

Fig. 3 is an enlarged side elevation of one of the plate holder carriers.

Fig. 4 is a vertical central section of the same.

Fig. 5 is a side elevation of one of the carriers, taken from the left of Fig. 3.

The common form of conveyer for pie-making machines now in use includes a track on which the plate holder carriers are slidably supported. The carriers are connected by an open link chain arranged to form an endless belt for moving the plate holders along a definite path to coact with the pie-forming mechanisms. The conveyer chain heretofore used has been found to be unsatisfactory because, after considerable use, the links wear and become distorted, as well as stretch, with the result that, in operation, the plate holders vary from their true path, and do not accurately coact with the pie-forming mechanisms.

The present invention is embodied in an improved form of conveyer mechanism constructed to overcome the above mentioned objectionable feature of the chain conveyer heretofore in use.

In the form shown, the improved form of conveyer includes a plurality of plate holder carriers and a corresponding number of bars pivotally connected together in alternating arrangement to form an endless belt. The plate holder carriers are slidably supported on a track and are driven through a predetermined horizontal path by sprocket members which coact with the carriers to hold them in upright positions.

The supporting frame structure and the various pie-forming mechanisms of the machine have been omitted from the drawings, because they do not form a part of the present invention.

Only one end of the conveyer has been illustrated in the drawings, but it will be understood that both ends are substantially identical.

In the construction shown in the drawings, the improved form of conveyer comprises an elongated horizontally disposed track 1, mounted on the frame structure of the machine (not shown), and including an outer endless section 2 and inner sections 3 arranged for slidably supporting a plurality of plate holder carriers 4, which are connected together by a corresponding number of bars 5, and which are moved through a predetermined path by a pair of driving sprocket members 6, only one of which is shown.

Each of the plate holder carriers 4 comprises a hollow post 7 having mounted thereon oppositely disposed rollers 8 arranged to ride upon the track sections 2 and 3 for slidably supporting the carriers. Slidably supported in the hollow post 7, is an upright spindle 9, which carries at its upper end a plate holder 10, which is arranged to support the pie tin (not shown). The spindle 9 extends through the hollow post 7 and is normally urged upwardly by a helical spring 11 embracing the spindle 9 and bearing between shoulders 12 and 13 formed on the spindle and post, respectively. Mounted on the lower end of the spindle 9 and bearing against the lower end of the post 7, is a collar 14, which is adjustable for varying the position of the spindle with respect to the carrier.

Mounted on the collar 14, is a roller 15, which is arranged to coact with a cam 16 formed on the track section 2 for pulling the spindle downwardly against the action of the spring 11 to facilitate the coaction of the plate holders with the crust trimming mechanism, which is not shown but which is well understood in the art.

Formed on opposite sides of the post 7, adjacent the upper end thereof, are two pairs of spaced lugs 17 arranged to form supports for pivot pins 18 which extend through apertures formed in the outer ends of the connecting bars 5. The carriers 4 and bars 5 are pivotally connected together in alternating arrangement to form an endless belt.

The inner side of the post 7 is formed to provide a substantially semi-cylindrical bearing surface 19 arranged to coact with concave seats 20 formed in the outer ends of the radially disposed arms 21 of the sprocket members 6. A shoulder 22 is formed on the post 7 in position to coact with the upper edges of the sprocket arms 21.

In order to facilitate the separation of the concave seats 20 of the sprocket members from the bearing surfaces 19, a block 23 is formed on the inner side of the post 7 to form a shoulder located in position to coact with the inner track sections 3 to secure the carrier against being drawn inwardly by the sprocket arms 21 at the time each arm becomes disengaged from the post 7.

In operation, the sprockets 6 coact with the posts 7 to hold the carriers in upright positions and drive them through a fixed path without variation therefrom. The improved form and arrangement of the bars 5 and carriers 4 insure the several parts against stretching and distortion whereby the pie tins will always be in proper positions to accurately coact with the pie forming mechanisms.

Although but one specific embodiment of this invention has been herein shown and described, it will be understood that numerous details of the construction shown may be altered or omitted without departing from the spirit of this invention as defined by the following claims:—

1. A conveyer for pie-making machines comprising a plurality of pie plate carriers including upright posts and a corresponding number of rigid bars, said upright posts and bars being pivotally connected together in alternating arrangement so as to form an endless belt member movable in a predetermined horizontal path to bring said carriers into position to coact with forming mechanism, and a driving sprocket member coacting with said posts for holding said carriers in upright positions and moving them through said path.

2. A conveyer for pie-making machines comprising a horizontal elongated track including spaced rails, an endless belt member including a plurality of plate carriers supported on said rails, a pair of driving sprocket members including radially disposed arms having their outer ends formed to provide concave seats arranged to coact with said carriers for holding said carriers in upright positions and moving them along said rails through an endless path, and a guide bar arranged on each of said carriers in position to coact with the inner one of said rails for retaining said carriers in alinement with the axis of said path while said concave seats are being disengaged from said carriers.

Signed at Chicago this 27 day of July 1922.

DENNIS WOOD SMITH.